United States Patent

Rajaraman et al.

[11] Patent Number: 5,838,957
[45] Date of Patent: Nov. 17, 1998

[54] MULTI-STAGE TIMER IMPLEMENTATION FOR TELECOMMUNICATIONS TRANSMISSION

[75] Inventors: Balachandar Rajaraman, Raleigh, N.C.; Subir Varma, San Jose, Calif.

[73] Assignee: International Business Machines Corporation, Armonk, N.Y.

[21] Appl. No.: 595,065

[22] Filed: Feb. 1, 1996

[51] Int. Cl.$^6$ .................................................. G06F 1/14
[52] U.S. Cl. ................................................. 395/557
[58] Field of Search ........................................ 395/557

[56] References Cited

U.S. PATENT DOCUMENTS 5,491,815  2/1996  Basso et al. ............................ 395/550

OTHER PUBLICATIONS

"Hashed and Hierarchical Timing Wheels: Data Structures for the Efficient Implementation of a Timer Facility" by George Varghese and Tony Lauck, Digital Equipment Corporation, Littleton, MA, ACM 089791–242–X/87/0011/0025, pp. 25–38.

"Timers in OSI Protocols: Specification Versus Implementation" by E. Mumprecht, D. Gantenbein and R. Hauser, Zurich, Switzerland, Aug., 1987, internal IBM publication, pp. 93–98.

APPN High Performance Routing Architecture Reference, Aug., 1995, IBM Document No. SV40–1018–00, IBM Corp., APPN Architecture. Department BUFA, P.O. Box 12195, Research Triangle Park, NC 27709.

*Primary Examiner*—Thomas M. Heckler
*Attorney, Agent, or Firm*—Jeanine S. Ray-Yarletts

[57] ABSTRACT

Telecommunications networks require a large number of timers to support the necessary dispatching of tasks. These timers require significant CPU cycles. The present invention describes a method and apparatus for reducing the CPU requirements of timers while maintaining their utility and accuracy by using multi-class periodic timers.

16 Claims, 12 Drawing Sheets

FIG. 4 RELATIONSHIP BETWEEN PROTOCOL LAYERS

FIG. 5  ARB MECHANISM

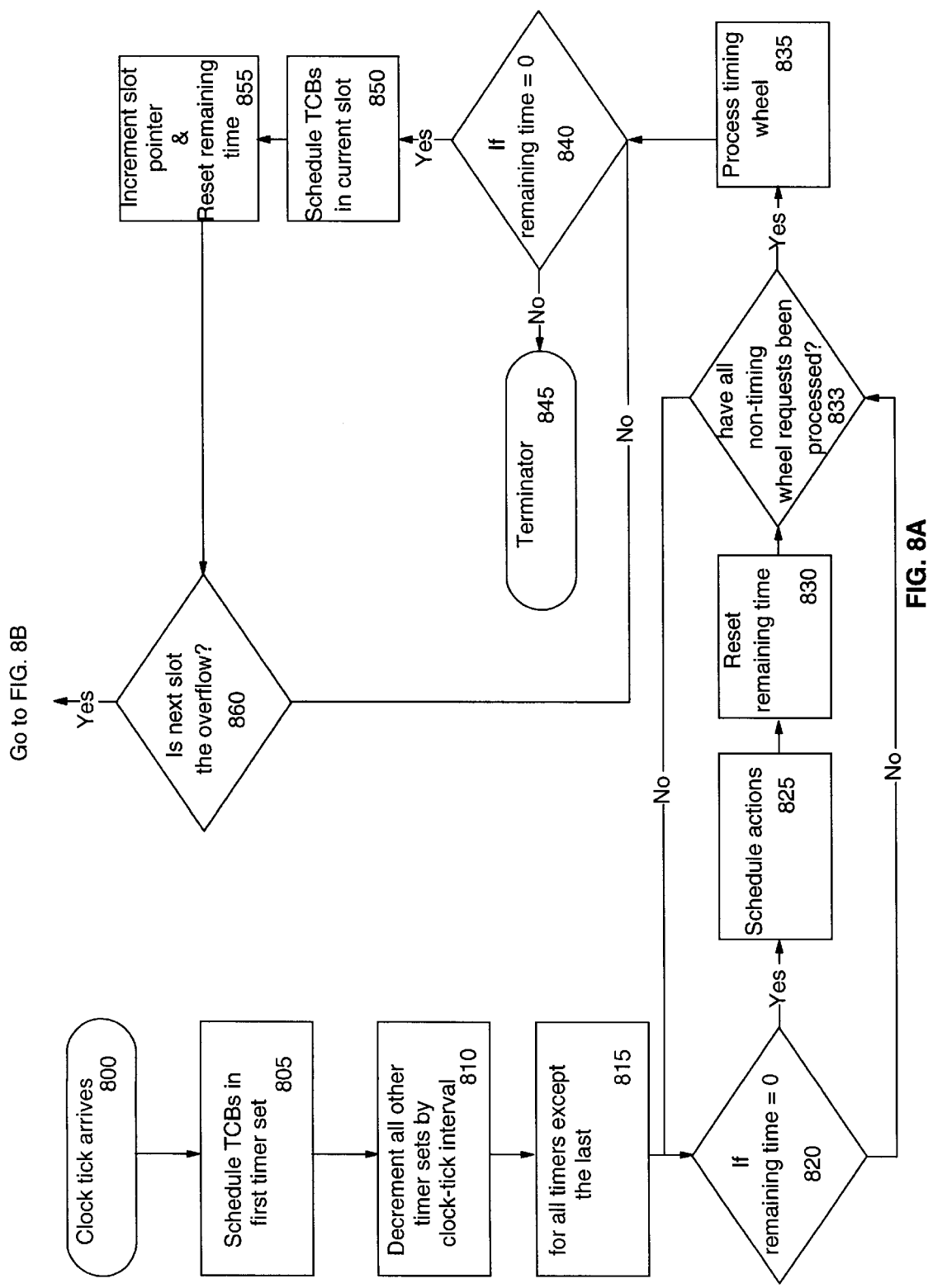

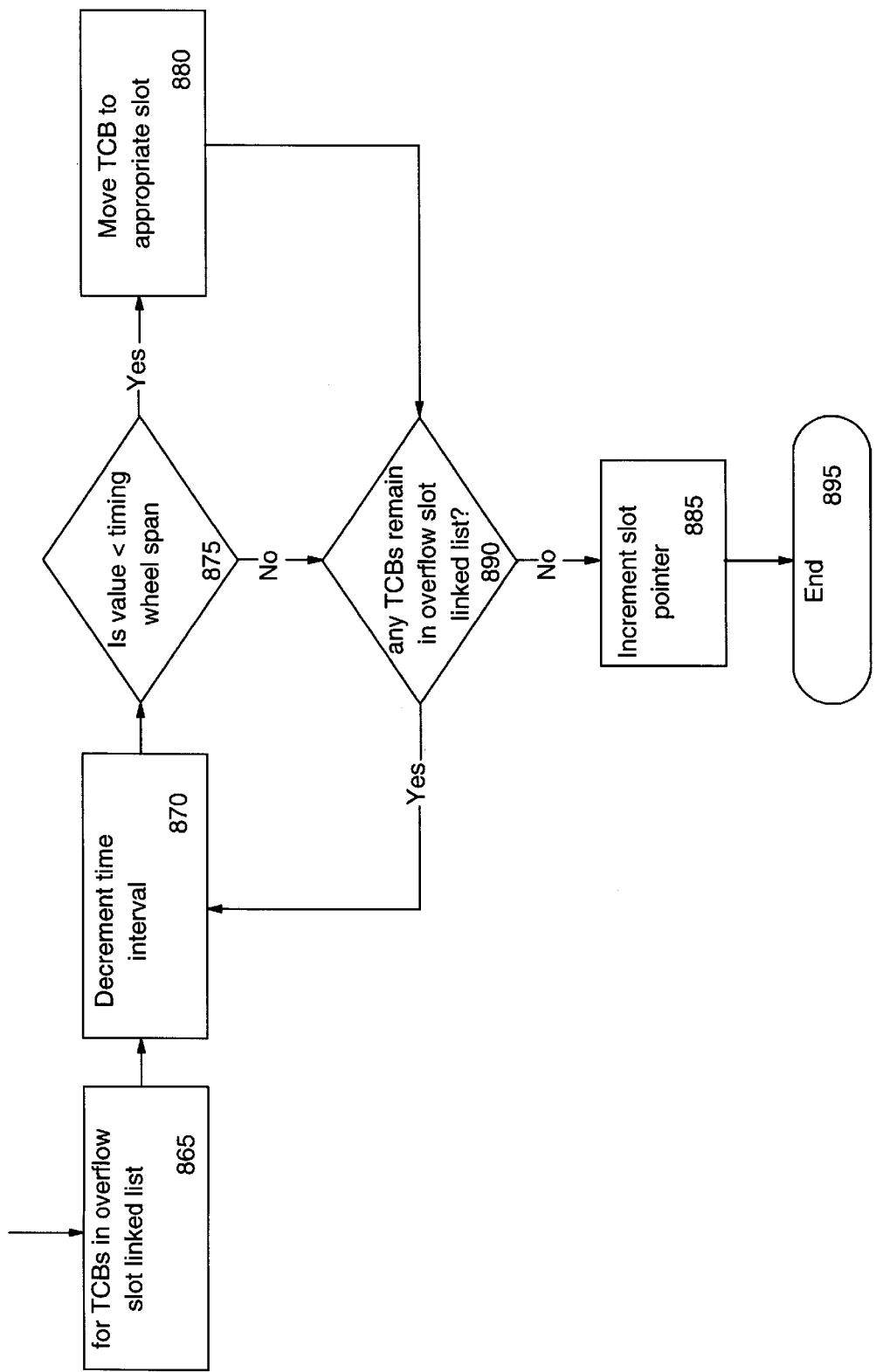

MULTI-STAGE TIMER IMPLEMENTATION FOR TELECOMMUNICATIONS TRANSMISSION

FIELD OF THE INVENTION

This invention relates to telecommunications network timing mechanisms in software. More specifically, the invention relates to a multi-class periodic timer implementation for a telecommunications network wherein multiple timing queues are used to minimize the overhead required to schedule events, reorder events, and remove events from the schedule queues.

BACKGROUND OF THE INVENTION

High Performance Routing (HPR) is a new transport level protocol used in SNA/APPN (Systems Network Architecture/Advanced Peer-to-Peer Networking) networks. One of the most significant features in HPR is end-to-end adaptive rate based flow control(ARB), which replaces window based flow control used in prior implementations of the SNA architecture. HPR also provides end-to-end error recovery and path switching mechanisms. For additional information on HPR, seeAPPN High Performance Routing Architecture Reference, IBM publication number SV40-1018 which is also accessible from the world wide web at/pub/aiw/appn/hpr/hpr5.psbin. Each HPR connection, in implementing the different features, can make multiple concurrent periodic timer requests. Further, timer requests for the different features can occur at different frequencies. Timer requests can be broken down into timer classes based on the frequency of timer requests. At one extreme, a timer class can be characterized by having a low number of outstanding timer requests but occurring at a relatively high frequency. At the other extreme, a timer class can have a very large number of outstanding requests but with a relatively large interval between requests (hence, a low frequency). Some implementations of timer management in software can significantly increase CPU cycle consumption thus degrading overall system processing capability, especially when managing disparate timer classes. For these reasons, timer design is a critical aspect of the HPR implementation.

In general, implementing a timer requires the provision of the following basic primitives:

Start_timer: This primitive allows the insertion of a timer request into the timer data structure so that a specified action can be scheduled at the appropriate time.

Schedule_request: This primitive provides the mechanism to locate the timer request(s) which has expired (when the primitive is invoked) and schedule the specified action. This primitive is usually invoked as part of processing an interrupt from the system clock.

Cancel_request: Timers are often used to provide a backup mechanism to processes waits for signals which are delayed or lost (For example, a timer to limit the amount of time spent waiting for an acknowledgement before allowing retransmission to begin). However, most often the signal is received before the timer expires which necessitates cancelling or rescheduling the timer request.

The cost of implementing a periodic timer mechanism is governed primarily by the efficiency of the implementation of the Start_timer and Schedule_request primitives. The main costs involved in timer implementations are:

Cost of inserting a timer request (Timer Control Block or TCB) in the timer data structure i.e. the cost of searching/sorting the timer data structure Cost of determining which timer request(s) have expired when the Schedule_request primitive is called and scheduling the specified actions.

Cost of timer dispatch processes i.e. the cost of the process which causes the hardware timer to be scheduled and notify the timer process when the time has expired.

An optimal timer implementation minimizes the combined cost of: 1) inserting a TCB in the timer data structure; 2) determining which TCBs have expired and scheduling the associated actions; and 3) the timer dispatch process, for a wide range of timer classes. To contrast different timer implementations in software, it is first necessary to quantify the impact of the implementation on the system. The measure used to quantify system impact is the number of instructions (in millions) executed per second (MIPS) to implement the timer function. The MIPS expended for the timer function in HPR depends on the data profile i.e. the nature and amount of data transported by HPR. Data profiles for a large system environment can be categorized as the following:

*OLTP (On-line Transaction Processing) Applications

Data can be characterized by a large number of HPR connections with each connection sending/receiving relatively small amounts of data. Connections will also have significant idle times between successive data flows. This data profile results in fairly low frequency of timer requests per connection as well as in aggregate. However, the number of outstanding timer requests can be very large because timer duration is long.

*High Speed Server Applications

Examples of these applications include realtime or pseudo-realtime delivery of compressed full motion video and file transfer applications. This data can be characterized by a limited number of HPR connections, each transporting very large amounts of data. For this data profile, timer requests occur at a high frequency to satisfy bandwidth requirements as well as minimize storage requirements due to the selective retransmission policy used in HPR. However, the number of outstanding timer requests are relatively small as compared to OLTP applications because the timer duration is short.

A typical large system environment will comprise a combination of OLTP and High speed server applications. Based on a historically determined generic workload for this environment, OLTP applications contribute 416 active connections with timer requests every 100 milliseconds (msecs) and High speed applications contribute 4 connections with timer requests every 1 msec. Additionally, typical values for the cost of executing the timer primitives are as follows:

Accessing and modifying each element of the timer data structure (10 instructions)

Determining and scheduling the actions associated with each timer request that has expired (50 instructions)

Timer dispatch process (600 instructions).

The simplest implementation of a timer structure, as shown by the prior art in FIG. 1, is to have a linked list of TCBs, ordered according to their time of expiration. FIG. 1 shows a timer control block (TCB), 101, which represents a timer which expires at the current time ($T_C$). The next TCB, 102, represents a timer which expires x milliseconds from the current time. The TCB 103 represents the event which is scheduled to occur y milliseconds after the event in 102. This chain continues until the last scheduled event in the chain is reached. The sorting cost of this structure is proportional to the number of entries in the list i.e. of order n, O(n), where n is the number of entries in the list. This cost is incurred every time a TCB is added to the linked list since, as shown in FIG. 1, the list must be scanned to determine where the TCB is to be added. To insert an item that is scheduled to expire after $T_{C+X+Y}$ (103) and before $T_Z$ (105), a compare must be made between the value to be inserted (114) and $T_C$; if the value is greater than $T_C$, it must then be compared with the value next in the TCB chain ($T_{C+X}$). This process is continued until the value being inserted is less than the value in the chain. When this occurs, the value is inserted before the compare value. On successive timer expirations, the new timer interval is set according to the value of the first TCB that is to expire, so that there is a timer dispatch with every TCB expiration. This implementation can lead to excessive MIPS being devoted to adding TCBs to the timer data structure as well as dispatching the timer process. Even though the sorting cost can be reduced to O(log(n)) by using data structures such as heaps and left-leaning trees, the cost of timer dispatches (scheduling TCBs) cannot be reduced for this linked list implementation. For the combined OLTP and high-speed application data profiles, the implementation cost using a linked list approach is approximately 22.78 MIPS as calculated by:

OLTP applications:
TCB Insertion: 4160 instructions/TCB insert* 4160 TCB inserts/second=17.31 MIPS
Expiration Processing: 4160 expirations/second* 50 instructions/expiration=0.21 MIPS
Timer Process Dispatch: 4160 dispatches/second* 600 instructions/dispatch=2.50 MIPS
TOTAL OLTP MIPS=20.02 MIPS High Speed Server applications:
TCB Insertion: 40 instructions/TCB insert* 4000 TCB inserts/second=0.16 MIPS
Expiration Processing: 4000 expirations/second* 50 instructions per expiration=0.20 MIPS
Timer Process Dispatch: 4000 dispatches/second* 600 instructions/dispatch=2.40 MIPS
TOTAL High Speed Server application MIPS=2.76 MIPS
TOTAL Average workload MIPS=22.78 MIPS The major component of this cost is due to accessing and modifying the timer data structure to add a TCB. This cost can be reduced by using a more efficient approach to TCB insertion. However, the MIPS requirements are still significant.

As shown in FIG. 2, the clock-tick approach tries to reduce the cost of TCB insertion and the excessive number of timer dispatches by controlling the frequency of timer process dispatches. The period between timer dispatches is the clock-tick interval which is represented as $T_A$. TCBs are inserted into the TCB linked list by adding the TCBs to the end of the TCB chain without regard to expiration ordering. There is no searching done prior to insertion, a pointer is utilized which points to the end of the TCB chain. In FIG. 2, $T_f$ (201) was the first TCB inserted into the TCB chain, then $T_g$ (202) was inserted, next $T_h$ (203) was added, then $T_j$, and continuing onward to $T_n$. At predetermined clock-tick intervals, $T_A$, the linked-list of TCBs is searched. Each TCB which expires on or before the current time is dispatched for execution. Any TCB which expires after the current time interval is decremented by the clock-tick interval ($T_A$). Hence, if the clock-tick interval were 5 ms, and the TCB linked-list contained entries expiring at 10 ms, 3 ms, 1 ms, 20 ms; after the next clock-tick, the TCB linked-list would be 5 ms, 15 ms. The cost of updating the TCBs once every clock-tick interval is of O(n) since each of the TCBs must be updated. However, the cost of inserting a new TCB is reduced to O(1) since TCBs are always added to the end of the TCB chain. The clock-tick interval is typically chosen to be a relatively large value to reduce the cost of timer dispatches and the cost of updating the TCBS. This introduces a certain amount of imprecision in scheduling the actions associated with a TCB since the TCBs are only examined every clock-tick interval. The maximum error that can occur is at most the clock-tick interval. Assuming that a 5% imprecision can be tolerated, for the OLTP and High-speed application profiles and the clock-tick interval is 50 microseconds this approach requires 96.448 MIPS as calculated by:

OLTP applications:
TCB Insertion: 10 instructions/TCB insert* 4160 TCB inserts/second=0.042 MIPS
Expiration Processing and Timer Process Dispatch:
Since the clock-tick frequency is set to that required for high-speed applications, the cost of expiry processing and timer dispatch processing is accounted for in the calculation for high speed server applications.

High Speed Server applications:
TCB Insertion: 10 instructions/TCB insert* 4000 TCB inserts/second=0.04 MIPS
Expiration Processing: 20,000 expirations/second* [(0.408*50 instructions/expiration)+(420 entries* 10 instructions/entry)]=84.408 MIPS
Timer Process Dispatch: 20,000 dispatches/second* 600 instructions/dispatch=12.0 MIPS TOTAL High Speed Server application MIPS=96.44 MIPS The major reason for this extremely high MIPS requirement is the necessity to maintain the clock-tick interval at a small value to meet the precision requirements of the high-speed applications. Consequently, the cost of processing the TCBs on timer process expiry is substantial. Assuming that a lower precision can be tolerated (say 20%), the cost of this approach drops to 24.49 MIPS.

Neither of the approaches described above provides a general solution for both OLTP and high-speed application data profiles. In the ordered linked list approach, the TCB insertion cost is the most significant overhead. This is due to the large number of TCBs that are necessitated by the OLTP application profile and consequently large number of TCBs may need to be scanned to determine the appropriate point to insert a TCB. In the clock-tick approach, the predominant overhead is due to timer expiry processing at the high clock-tick frequency necessitated by high-speed applications in order to maintain reasonable timer accuracy as well as the cost of updating every TCB on every timer expiry. No simple tradeoffs exist since both application data profiles coexist in most large system environments and a network timing mechanism must be able to handle both data profiles efficiently.

OBJECTS OF THE INVENTION

One object of this invention is to provide a mechanism for software timer control in a telecommunications network which meets the demands of diverse application data profiles including OLTP applications as well as high-speed applications while minimizing the processing overhead for timer management.

Another objective is to minimize the timer error for all typical application data profiles.

SUMMARY OF THE INVENTION

This invention discloses an efficient implementation of a high frequency timer used in a computer network. The invention includes a system and method for implementing a plurality of burst timer sets, one or more timing wheel sets and means for determining which timer set to schedule each TCB to. FIG. 3 is an example of a communications network. Two (or more) host computers (301,302) are connected by a communications line (303). Each of the host computers has one or more consoles or terminals (304,305) attached to it. It is obvious to one skilled in the art that this example is an extremely simplistic view of a network. Typical networks are much more complex. This view is for explanation purposes only and is not meant to limit the invention in any way.

FIG. 4 shows a more detailed view of the interworkings of the HPR communications in the host computer. The application layer (401) communicates with the remote application over one or more sessions (411). The sessions are managed by the session layer (403). One or more sessions can be multiplexed over an HPR connection (413). Multiple HPR connections can exist between this host and other hosts or nodes in the network. The HPR connection represents an end-to-end communication capability between two end-points in the network. The network layer (405) manages HPR connections. Physical connectivity between the host computer and the adjacent device is managed by the physical layer (407) by using the physical link (415). The end-to-end connection may involve several devices which are physically connected.

The high frequency timer of this invention is called a burst timer and is used for the ARB function in HPR and also provide for lower frequency timer requests for other HPR functions with minimal degradation in efficiency. The HPR ARB function uses the burst time ($B_T$) to control the rate ($R_S$) at which data is transmitted into the network in the form of Network Layer Packets (NLPs). The burst timer periodically allows a certain amount of NLPs or bursts to be sent into the network. The amount of data in each burst denoted by ($B_S$) is a predefined quantity The predefined burst quantities are shown in FIG. 5 as 501, 502 and 510. The interval between bursts depends on the data rate required by the application and the maximum throughput that can be supported by the underlying network. The intervals are represented in FIG. 5 as 520. The data profiles of some applications may require a very short burst interval on the order of 1 millisecond (for example High speed applications) while the throughput requirements of OLTP applications can be met with a much larger burst interval on the order of 10–100 milliseconds. As shown in FIG. 5, transfer of one logical piece of data may span many bursts (as represented by 530). The rate at which data is sent into the network is:

$$R_S = \frac{B_S}{B_T}$$

For high speed applications, especially with real-time or pseudo-realtime requirements, it is critical to maintain the data rate $R_S$ in the presence of timer inaccuracies while minimizing the system impact of maintaining precise timers. This invention includes two alternative methods of timer design which permit the data rate ($R_S$) to be maintained in the presence of imprecise values of the burst timer ($B_T$).

BRIEF DESCRIPTION OF DRAWINGS

FIGS. 8A–B illustrate the flowchart of the logic used in the present invention to process the TCBs of the timer structure when a clock-tick interrupt occurs;

DESCRIPTION OF THE PREFERRED EMBODIMENT

There are two alternative methods to the preferred embodiment of the invention which are described below.

METHOD 1

Figure 1:
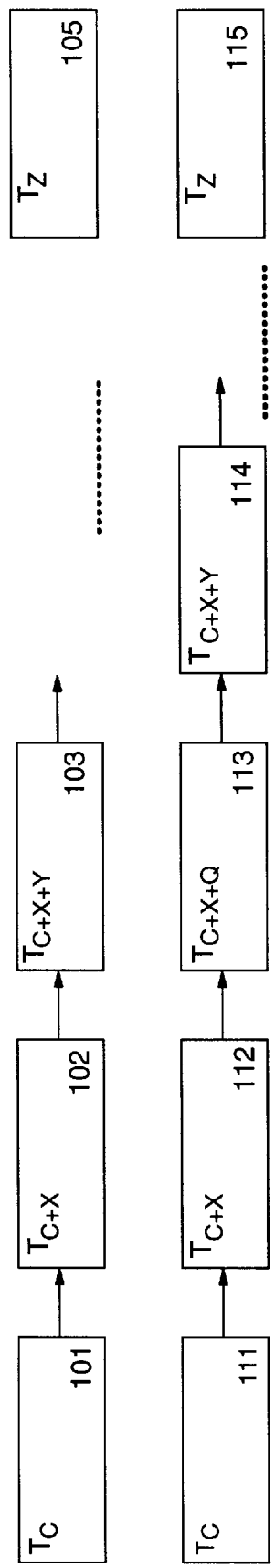
FIG. 1 shows a prior art method of timer control, using a simple linked list structure where the entries in the list represent tasks awaiting timer expiration, and are ordered by expiration time.
Figure 2:
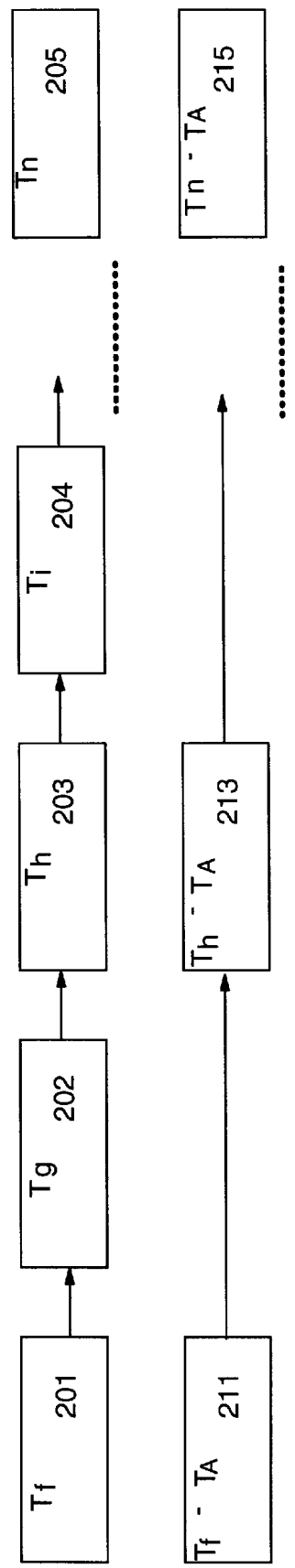
FIG. 2 shows a prior art method of timer control using a clock-tick approach, where the entries in the linked list are not ordered by expiration time.
Figure 3:
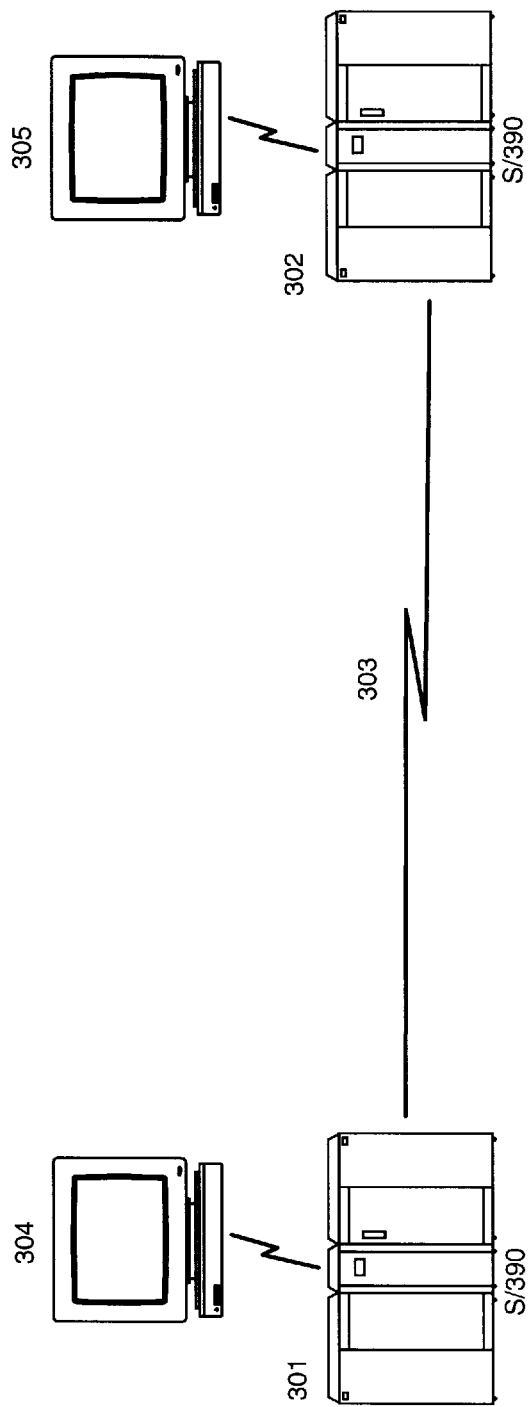
FIG. 3 shows a typical communications network, in which the present invention may be practiced.
Figure 4:
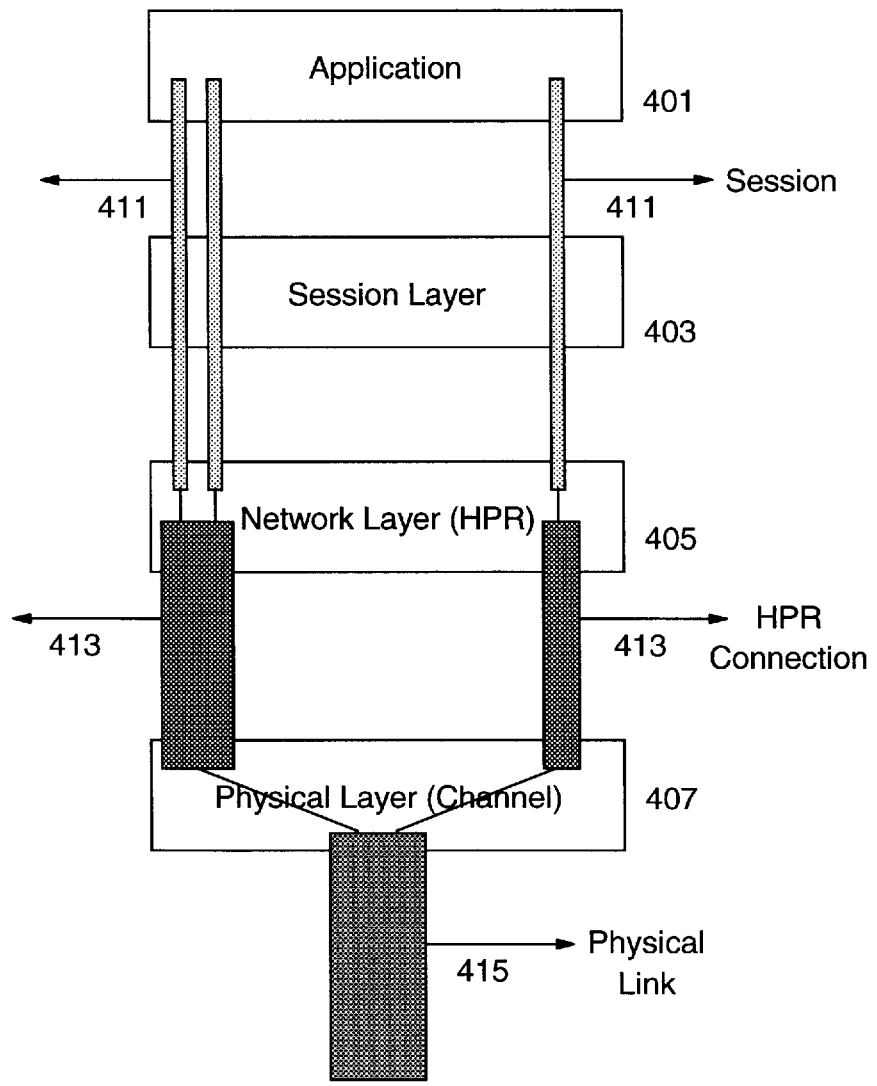
FIG. 4 shows the relationship among the protocol layers of a communication architecture, and how High Performance Routing fits into this architecture.
Figure 5:
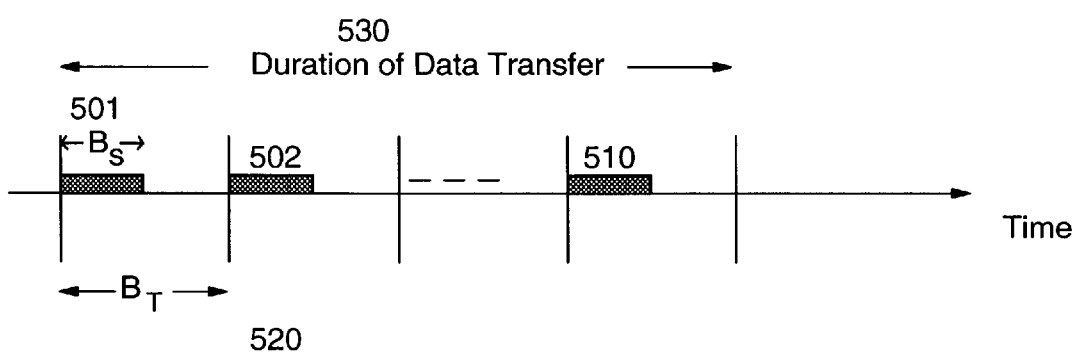
FIG. 5 shows the Adaptive Rate Balancing (ARB) mechanism implemented in High-Performance Routing, whereby data to be sent over a network is divided into bursts.
Figure 6:
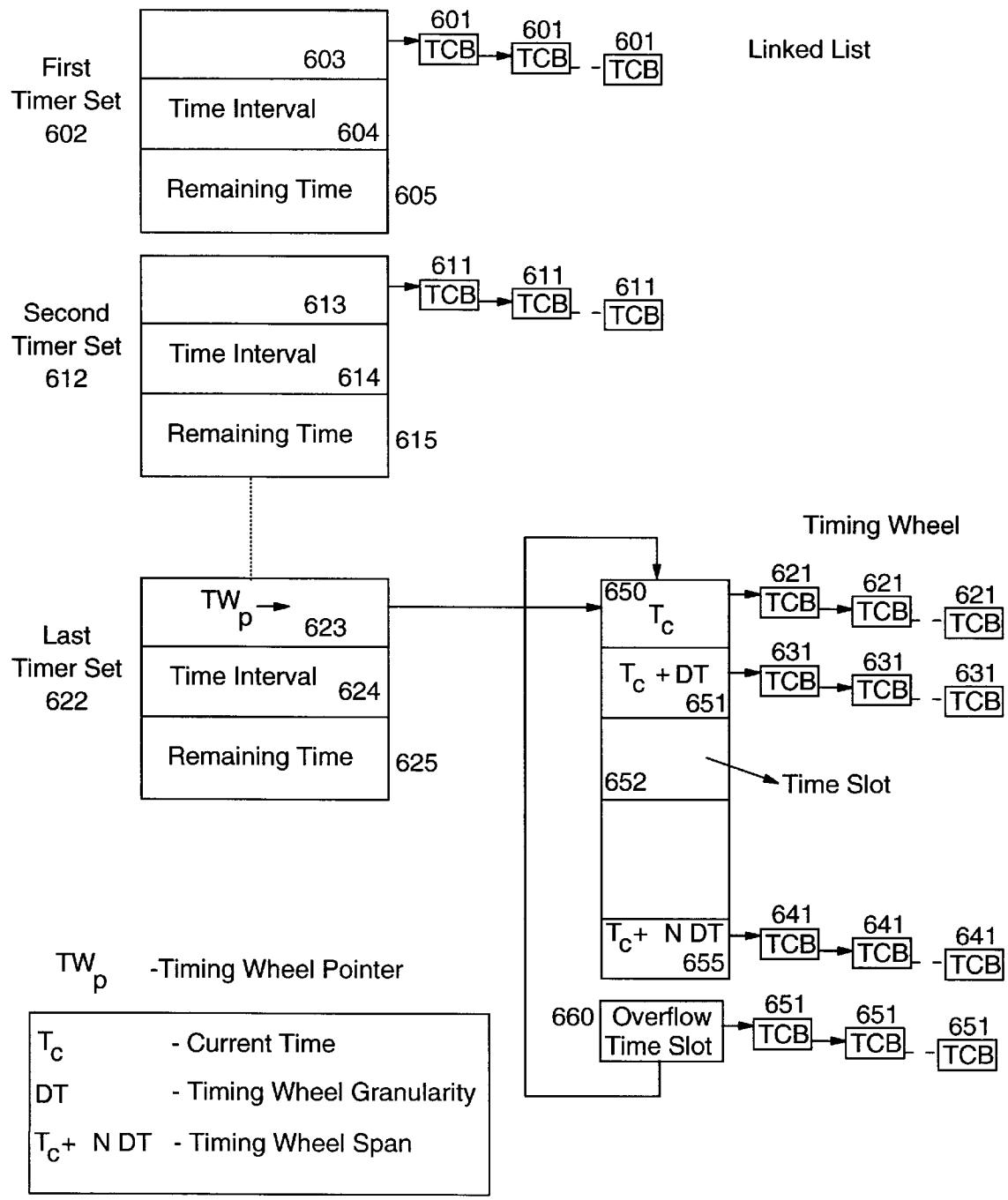
FIG. 6 shows the structure used to implementation of the current invention, with timer sets organized as one or more linked lists and a timing wheel.

For the current invention, the timer functions as a sorting system which receives timer requests for different application data profiles and sorts the requests according to the appropriate time interval values. This timer implementation reduces the expense of adding TCBs to the timer data structure as well as the cost of timer process dispatches. This invention presents a new approach to timer design that combines the benefits of a simple linked-list timer structure and the clock-tick approach while eliminating their disadvantages. As shown in FIG. 6, this timer design utilizes multiple sets of TCBs (601,611,621,631,641,651). Each timer set (602,612,622) spans a mutually exclusive range of time intervals. The timer sets are arranged in ascending order of the time intervals spanned by the timer set. The last set (622) in the structure is organized as a timing wheel while all other sets are organized using a simple linked list. Each set organized as a linked list contains a pointer to the first element of the linked list (603, 613). For the timer set organized as a timing wheel, there is a pointer (623) to a slot in the timing wheel. There is also an indication of the time interval (604,614,624) and an indication of the remaining time (605,615,625). Each set is processed as a whole using the clock-tick approach. The value of the clock-tick interval is chosen to meet the precision requirements of the high-speed application data profile. Timer requests are mapped to a timer set based on the time interval spanned by the timer set. For example timer requests for small time intervals are assigned to the first set (602). These requests are typically made by high-speed real-time application data profiles with relatively few connections. Hence the number of TCBs in this set are relatively small. Application data profiles that have a large number of connections but with timer requests for relatively large time intervals are assigned to the timer set organized as a timing wheel(622). Other timer requests are mapped to intermediate timer sets such as 612. The number of these intermediate timer sets can vary from 0 to any implementation specific value. As shown in FIG. 6, this timer design utilizes multiple timer sets. Each timer set has an associated time interval. This time interval represents the range of timer request values that the timer set can handle for a given precision requirement. For timer sets organized as linked lists, this range is defined as the span of the timer set. The spans of each timer set are mutually exclusive. Timer sets with spans that encompass small values of timer requests are organized as linked lists.

For the timing wheel (622), the timer interval represents the span of each slot in the timing wheel. The total span of the timing wheel is the range of time intervals covered by all the slots (650,651,652,655). Further, time intervals greater than the span of the timing wheel can also be accommodated using the overflow slot(660).

Each timer set is also associated with a "remaining time" (605,615,625) which represents the remaining time before any TCBs in the timer set will be examined in order to dispatch the actions associated with the TCB. The control of the hardware timer is based on a clock-tick approach. Timer dispatches are scheduled for a predefined interval based on the requirements of high-speed applications.

Figure 7:
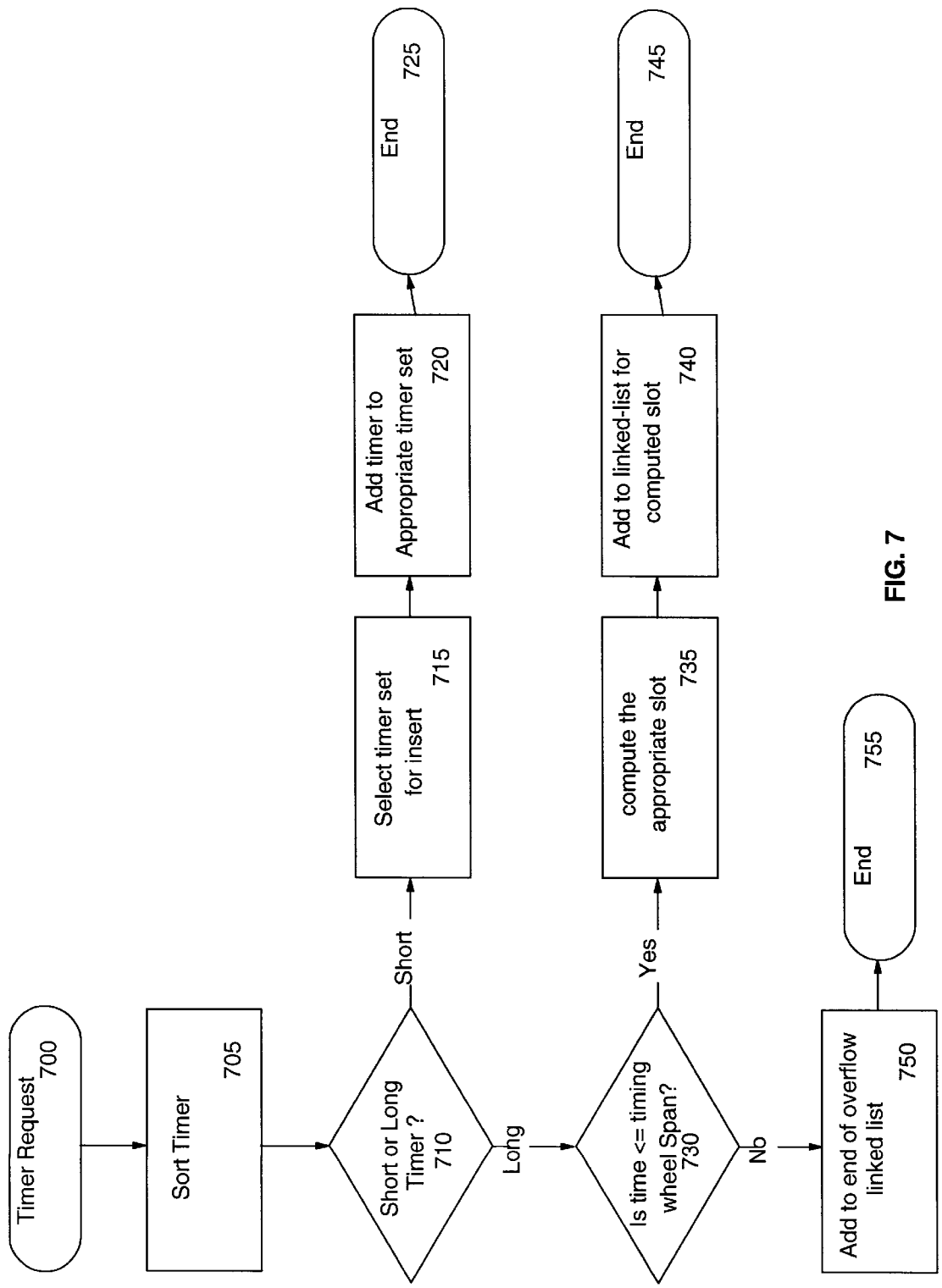
FIG. 7 illustrates the flowchart of the logic used in the present invention to add a Timer Control Block (TCB) for a timer request to the timer structure.

On each clock-tick, the remaining time (605, 615, 625) associated with each set is decremented by the clock-tick interval. Typically the first set (602) is always used for timer requests at the granularity of the clock-tick. Hence, any TCBs in the first timer set (602) are always dispatched. On decrementing the remaining time, if the resulting value is 0, then all TCBs associated with the timer set are dispatched and the remaining time (605, 615) is reset to the time interval (604, 614) for the timer set. The procedure for the timing wheel (622) when the remaining time (625) reaches 0 is somewhat different. When the remaining time for the timing wheel reaches 0, all TCBs associated with the current slot (650) are dispatched. The pointer to the current slot (623) is moved to point to the next slot (651) and the remaining time (625) is reset to the time interval (624) for the timing wheel. If the new slot is the overflow slot (660) then all TCBs in the slot are examined to determine which, if any, TCBs expire within the new span of the timing wheel. These TCBs are then moved to the appropriate slot in the timing wheel. FIG. 7 demonstrates the steps necessary to add a TCB to the timer structure. First a timer request is received (700). This request is processed by a timer sort function (705). Next a determination is made as to whether the timer is short such that it should be inserted into one of the linked list timer sets or long so that it should be inserted in the timing wheel timer set (710). If the timer is short, then a determination must be made as to which of the linked list timer sets to insert the TCB (715). Once the determination is made, the request is added to the end of the linked list of TCBs for the appropriate timer set (720), and the timer request function is complete (725). If the timer is determined to be long, then a check is made to determine whether the timing request is less than or equal to the timing wheel span (730). If the timer is less than or equal, then a determination is made of the appropriate slot to insert the timer request (735). The timer is then added to the end of the linked list for the computed slot (740) which completes the timer request (745). If the timer was greater than the timing wheel span, then the request is added to the end of the linked list for the overflow (750) which completes the requested function (755).

FIG. 8 is a flow diagram for processing clock-tick interrupts. The clock-tick interrupt arrives as shown in 800. Next all of the actions associated with all of the TCBs in the first timer set are scheduled (805). Then the remaining time for all other timer sets is decremented by the value of the clock-tick interval (810). Next, for all of the timer sets except the last (the last being the timing wheel), the timer sets must be processed (815). If the remaining time is zero for the timer set (820), the actions associated with all of the TCBs in the timer set are scheduled (825), then the remaining time is reset (830). When all of the non-timing wheel timers have been processed (833), then the timing wheel is processed (835). First, a determination is made as to whether the remaining time is zero (840). If it is not, then there is no further action necessary (845). If the remaining time for the timing wheel is zero, then the actions associated with the TCBs in the current slot are scheduled (850). The slot pointer is then incremented to the next slot and the remaining time is reset (855). If the next slot is not the overflow slot (860), then control returns to 840 and the next slot is processed. If the next slot is the overflow slot (860), then every TCB in the overflow slot linked list must be processed (865). First, for each TCB, the time interval requested is decremented by the timing wheel interval (870), then, if the resulting value is less than the timing wheel span (875) the TCB must be moved to the appropriate timer set slot (880). If there are any remaining TCBs in the overflow slot linked list (890) then they are processed (870), otherwise the slot pointer is incremented to the next slot (885) and the process terminates (895).

The costs associated with this approach can be determined as follows:

For the timer sets based on linked lists, the cost of adding a TCB to the appropriate timer set is the sum of the cost of the timer sort function and the addition of a TCB to the tail of a linked list. Both costs do not scale with the number of TCBs in the timer data structure i.e. the cost is O(1).

For the timer set based on the timing wheel, the cost of adding a TCB consists of determining the appropriate slot and adding the TCB to the tail of the linked list associated with the slot. The cost of determining the appropriate slot involves the calculation of an offset. This operation does not scale with the number of TCBs or the number of slots in the timing wheel. Adding a TCB to the tail of an unsorted linked list when a tail pointer is maintained is also O(1).

Hence, the cost of adding a TCB to the timer data structure in any case is of O(1).

The timer dispatch process is scheduled at the frequency of the clock-tick interval. Hence, the cost of the timer process dispatch is the same as in the prior art clock-tick approach.

The cost of expiry processing is a function of the number of timer sets. For a large number of timer sets the cost of expiry processing may become substantial.

Based on the earlier assumptions for the OLTP and high speed server application data profiles, the cost of this approach is approximately 13.06 MIPS, assuming that 50 instructions are required to insert a TCB in to the timing wheel and 10 instructions to add a TCB to a timer set organized as a linked list. The cost of timer management is reduced by a factor of 1.75 as compared to the ordered linked list approach and a factor of 6.5 over the clock-tick approach.

METHOD 2

Figure 9:
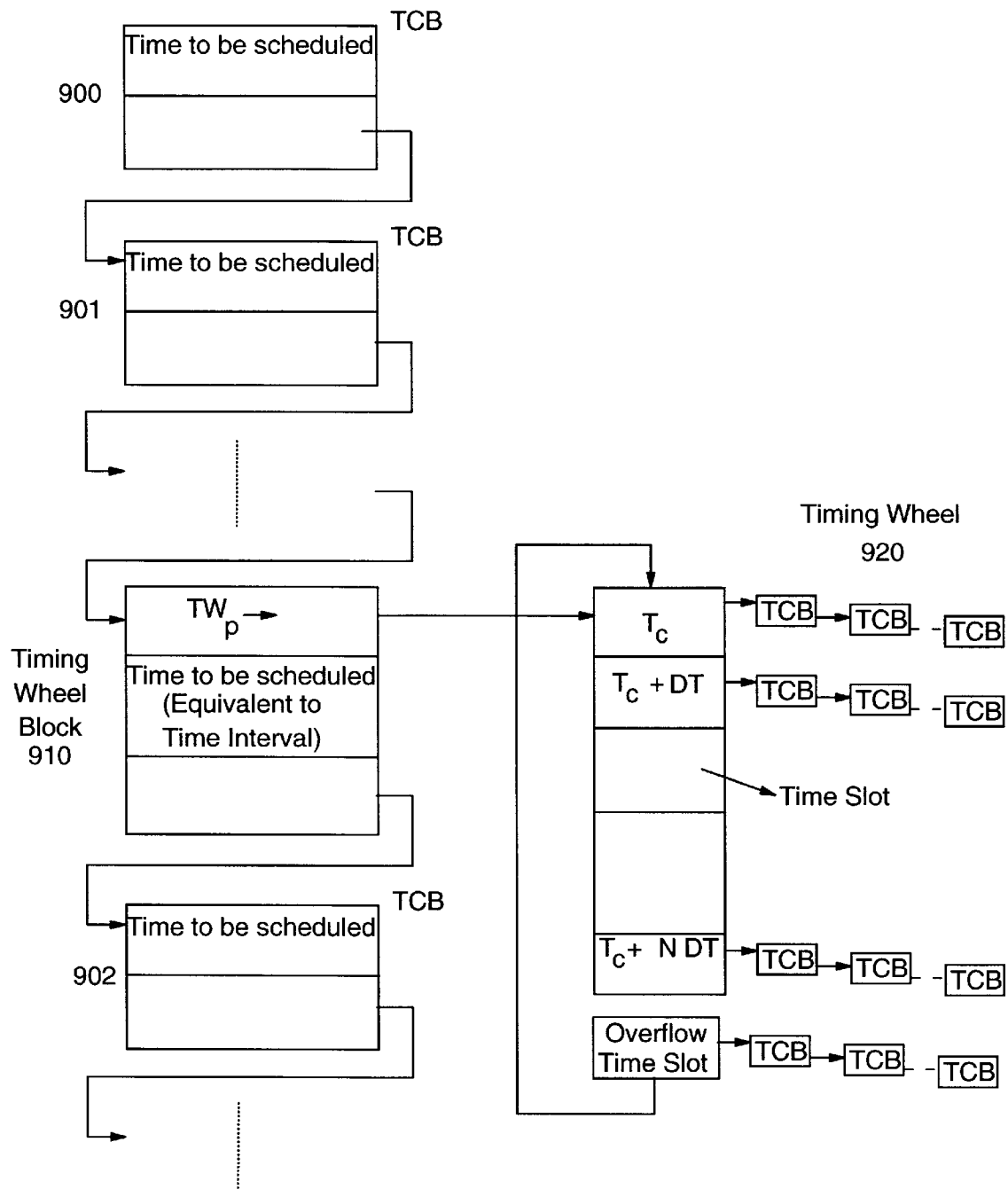
FIG. 9 illustrates an alternative embodiment of the present invention, where a single linked list including a timing wheel block is used, instead of the timer sets shown in FIG. 6.

An alternative approach to the method described above is to maintain a linked list of TCBs for timer requests for small time intervals. Further, this linked list also contains a single element that refers to a set of TCBs organized as a timing wheel rather than a unique TCB. This organization is shown in FIG. 9. The ordered linked list contains TCBs ordered according to the times of the TCBs to be scheduled (900, 901,902) for small time intervals. Where there are relatively large time intervals to be scheduled, a timing wheel block (910) is used instead of a TCB. This timing wheel block points to a timing wheel structure (920) which is the same as that described in FIG. 6 of method 1. Thus the timer sorting function categorizes timer requests so that they may be added to the timing wheel or directly into the linked list.

Figure 10A:
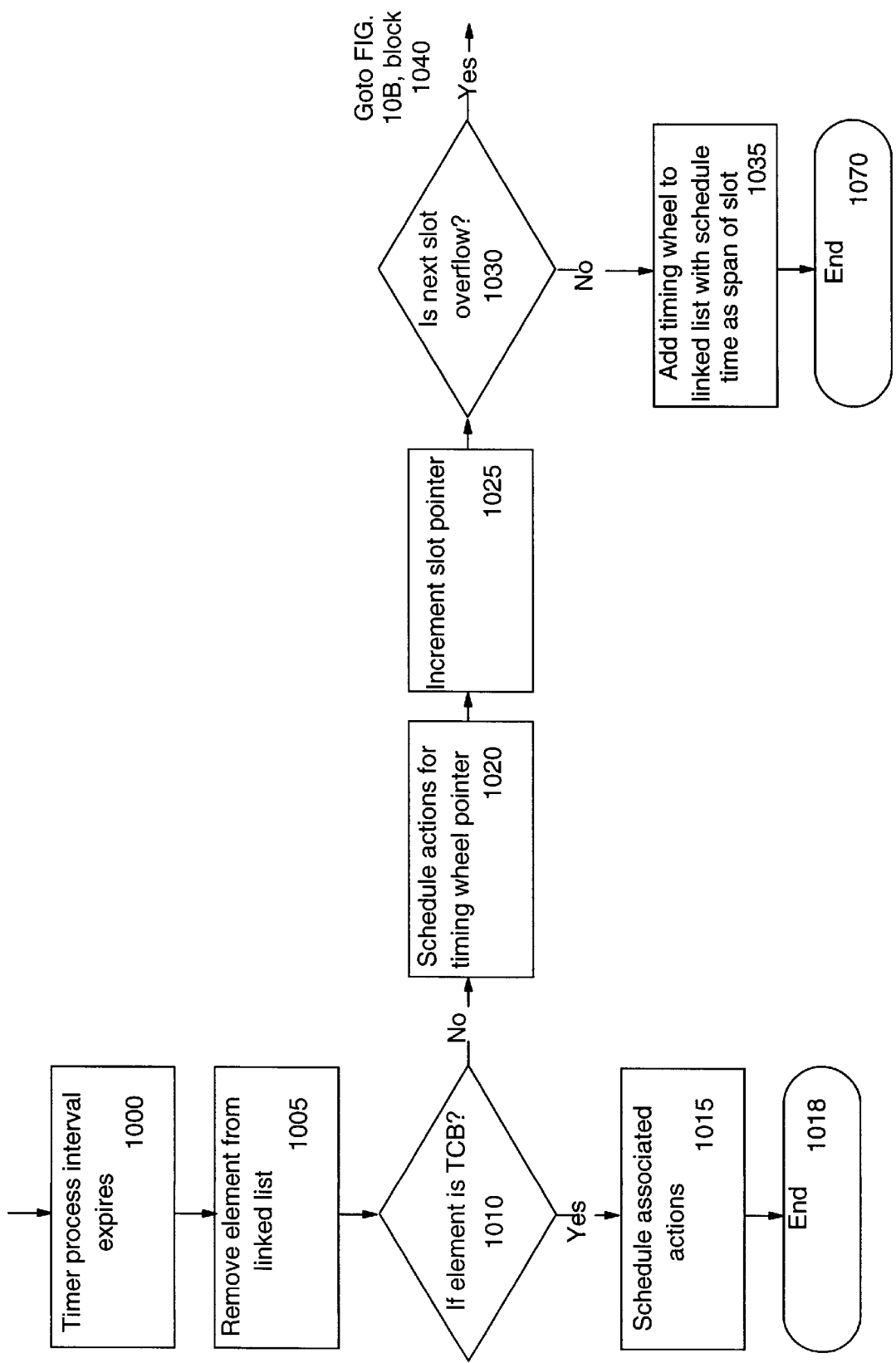
FIGS. 10 A–B show the flowchart of the logic used in the alternative embodiment of the present invention to process the TCBs of the timer structure when a timer interval expires.
Figure 10B:
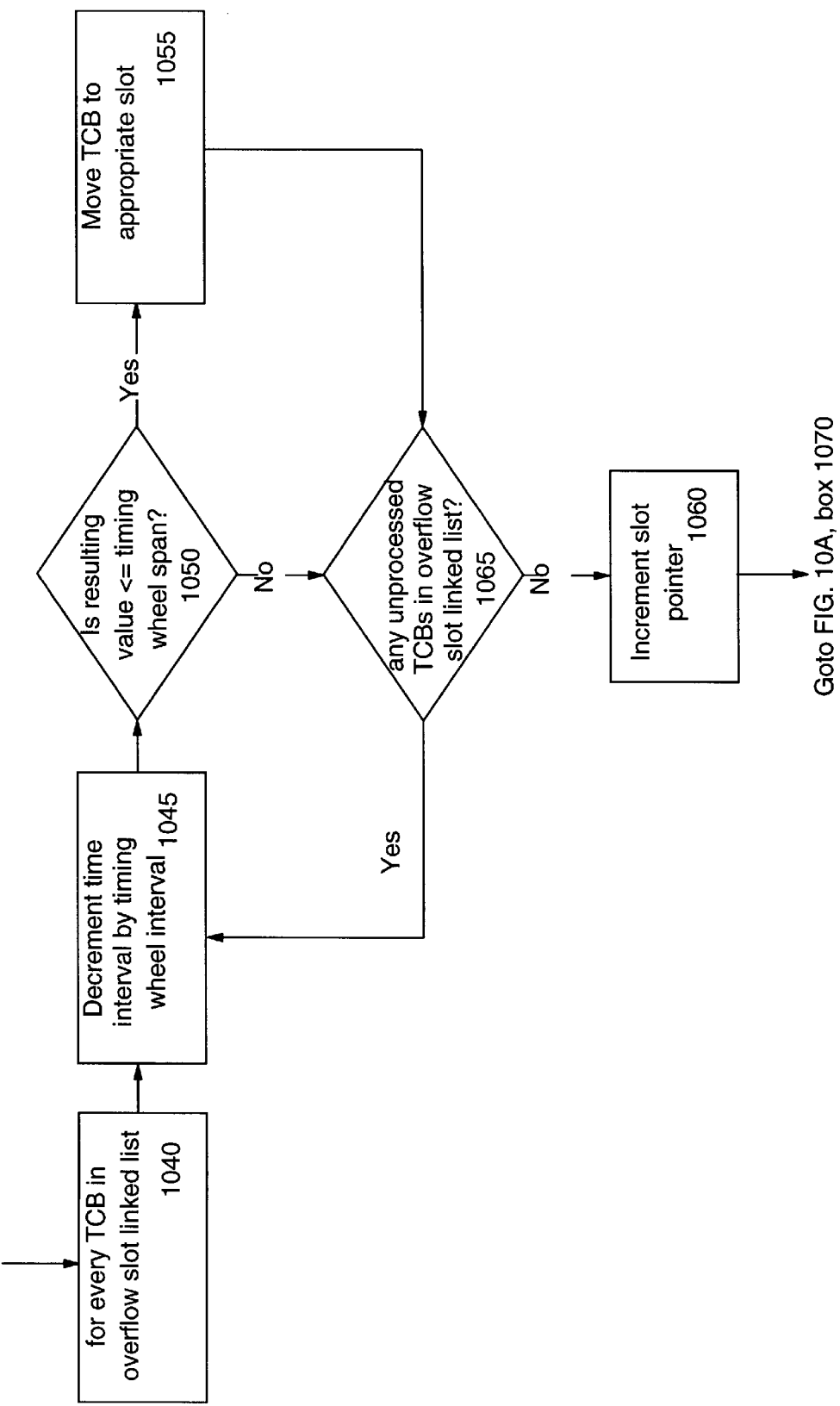

Timer processes are dispatched as in the linked list approach. For a timer expiry corresponding to a normal TCB, the action associated with the TCB is scheduled. If the timer expiration corresponds to the element that refers to the timing wheel, all TCBs in the current slot are scheduled and the pointer is incremented to point to the next slot. This is shown in more detail in FIG. 10. At 1000, the timer process interval expires which causes the expiration processing. First the element is removed from the linked list (1005), then a test is done to see if the element is a TCB or a timing wheel block (1010). If the element is a TCB, then the associated action is scheduled (1015) and the processing is ended (1018). If the element is a timing wheel block, then the actions associated with the TCBs in the current slot pointed to by the timing wheel pointer are scheduled (1020). The slot pointer is then incremented to the next slot (1025). If the next slot is not the overflow slot (1030), then the timing wheel block is added to the linked list with the time to be scheduled as the span of a slot (1035) and the processing is ended (1070). If the next slot is the overflow slot, then for every TCB in the overflow slot linked list (1040), the time interval is decremented by the timing wheel interval (1045). A check is then made to determine if the resulting value is less than or equal to the timing wheel span (1050). If it is, the TCB is moved to the appropriate slot (1055). If there are any unprocessed TCBs remaining in the overflow slot linked list (1065), then control is returned to block 1045, otherwise the slot pointer is incremented to the next (first) slot (1060) and the process has completed (1070).

The costs associated with this approach can be determined as follows:

- The cost of adding a TCB to the timer structure depends on whether the TCB is directly added to the linked list or to the timing wheel. Since the number of TCBs that are added directly to the linked list are small, the cost is relatively small even though the sorting cost is of O(n). The cost of adding the TCB to the timing wheel is O(1)
- The cost of timer process dispatch is proportional to the number of timer requests that are directly added to the linked list and the span of each slot of the timing wheel.

Based on the earlier assumptions for the OLTP and application data profiles, the cost of this approach is approximately 3.34 MIPS. The cost of timer management is reduced by a factor of 6.82 as compared to the ordered linked list approach and a factor of 25 over the clock-tick approach.

For a small number of high speed applications the performance of this approach is significantly better than Method 1. However, unlike Method 1 this approach does not scale well with an increase in the number of high speed sessions.

What is claimed is:

1. In a telecommunications network containing one or more host computers, each host computer containing a plurality of tasks, each of said plurality of tasks periodically generating timer requests wherein each timer request specifies the time interval in which it is to expire, a system for implementing a timing control mechanism for controlling said periodically generated timer requests:
   a first burst timer set for controlling said timer requests characterized by having specified that they are to expire within a first time interval;
   a second burst timer set for controlling said timer requests characterized by having specified that they are to expire after said first time interval, but before a second time interval, wherein said second time interval is longer than said first time interval; and
   a third timer set, organized according to a timing wheel structure, for controlling said timer requests characterized by having specified that they are to expire after said second time interval.

2. A system for implementing a timing control mechanism as in claim 1, wherein said telecommunications network is High Performance Routing (HPR) capable.

3. In a communications system containing one or more host computers, each host computer containing a plurality of tasks, each of said plurality of tasks periodically generating timer requests wherein each timer request specifies the time interval in which it is to expire, a system for implementing a timing control mechanism for controlling said periodically generated timer requests, comprising:
   a plurality of burst timer sets, each of said burst timer sets having associated therewith a unique expiration time; and
   a final timer set organized as a timing wheel, said final timer set characterized by having multiple, unique expiration times associated therewith, wherein the minimum of said multiple unique expiration times of said final timer set is greater than the maximum expiration time of any of said plurality of burst timer sets.

4. A system for implementing a timing control mechanism as in claim 3, wherein said communications system is High Performance Routing (HPR) capable.

5. In a communications system containing one or more host computers, each host computer containing a plurality of tasks, each of said plurality of tasks periodically generating timer requests wherein each timer request specifies the time interval in which it is to expire, a system for implementing a timing control mechanism for controlling said periodically generated timer requests, comprising:
   a plurality of burst timer sets, each of said burst timer sets having associated therewith a predetermined interval of time in which all timer requests in the timer set are to expire;
   a timing wheel set, said timing wheel set having associated therewith a predetermined interval of time in which all timer requests in the timing wheel set are to expire; and
   a means for determining which of said periodically generated timer requests are to be members of the burst timer sets and which of said periodically generated timer requests are to be members of the timing wheel set.

6. A system for implementing a timing control mechanism as in claim 5, wherein said means determines that a timer request is to be a member of the burst timer sets, or of the timing wheel set, by balancing the number of outstanding timer requests that are members of each timer set.

7. A system for implementing a timing control mechanism as in any of claims 1–6, wherein each of said burst timer sets is organized as a linked list.

8. A system for implementing a timing control mechanism as in claims 5 or 6, wherein said communication system is High Performance Routing (HPR) capable.

9. A system for implementing a timing control mechanism as in claim 5, further comprising:
 a plurality of said timing wheel sets, each of said sets having associated therewith a predetermined interval of time that is different from each of other said sets; and
 wherein said means for determining further comprises means for selecting one of said timing wheel sets after having determined that a timer request is to be a member of a timing wheel set.

10. In a computer network containing one or more host computers, each host computer containing a plurality of tasks, each of said plurality of tasks periodically generating timer requests wherein each timer request specifies a time interval in which it is to expire, a system for implementing a timing control mechanism for controlling said periodically generated timer requests, comprising:
 a plurality of burst timer sets,
 a timing wheel set, and
 wherein each of said timer requests is assigned to become a member of one of said burst timer sets or said timing wheel set by a means for balancing the number of said timer requests assigned to become members of each of said timer sets.

11. In a computer connected to a communications network, said computer containing a plurality of tasks, each of said plurality of tasks periodically generating timer requests wherein each timer request specifies the time interval in which it is to expire, a system for implementing a timing control mechanism for controlling said periodically generated timer requests, said timing mechanism comprising:
 means for executing a plurality of said periodically generated timer requests;
 means for scheduling said plurality of periodically generated timer requests, wherein said means comprise:
 a plurality of burst timer sets;
 a timing wheel set; and
 means for determining whether each of said timer requests should become a member of one of said burst timer sets, or should become a member of said timing wheel set.

12. A system for implementing a timing control mechanism as in claim 11, wherein said timing wheel set includes an overflow slot.

13. A system for implementing a timing control mechanism as in claim 11 or 12 wherein said communications network is High Performance Routing (HPR) capable.

14. A system for implementing a timing control mechanism as in claim 11, further comprising:
 a plurality of said timing wheel sets; and
 wherein said means for determining further comprises means for selecting one of said timing wheel sets after having determined that a timer request is to be a member of a timing wheel set.

15. In a telecommunications network containing one or more host computers, each host computer containing a plurality of tasks, each of said plurality of tasks periodically generating timer requests wherein each timer request specifies the time interval in which it is to expire, a system for implementing a timing control mechanism for controlling said periodically generated timer requests, comprising:
 a linked list wherein the entries in the list include at least one Timer Control Block (TCB) and zero or more timing wheel blocks, wherein:
 each of said TCBs or timing wheel blocks has associated therewith a task expiration time interval;
 said linked list is ordered in ascending order of said task expiration time interval; and,
 each of said timing wheel blocks points to a timing wheel set; and
 means for inserting said TCBs and timing wheel blocks into said linked list so as to maintain said linked list in ascending order of said associated task expiration time interval.

16. In a computer network containing one or more host computers, each host computer containing a plurality of tasks, each of said plurality of tasks periodically generating timer requests wherein each timer request specifies the time interval in which it is to expire, a system for implementing a timing control mechanism for controlling said periodically generated timer requests, comprising:
 a plurality of burst timer sets,
 a plurality of timing wheel sets, and
 wherein each of said timer requests is assigned to become a member of one of said burst timer sets or one of said timing wheel sets by a means for balancing the number of said timer requests assigned to become members of each of said timer sets.

* * * * *